United States Patent
Moon (10) Patent No.: US 7,479,758 B2
(45) Date of Patent: Jan. 20, 2009

(54) BATTERY PACK CASING WITH LOCK TYPE CONNECTOR

(75) Inventor: Ki eob Moon, Seoul (KR)

(73) Assignee: LG Chem, Ltd. (KR)

( * ) Notice: Subject to any disclaimer, the term of this patent is extended or adjusted under 35 U.S.C. 154(b) by 309 days.

(21) Appl. No.: 11/297,210

(22) Filed: Dec. 8, 2005

(65) Prior Publication Data

US 2006/0176014 A1    Aug. 10, 2006

(30) Foreign Application Priority Data

Dec. 10, 2004    (KR) .................. 10-2004-0104497

(51) Int. Cl.
*H02J 7/00*    (2006.01)
*H01M 2/00*    (2006.01)
*H01M 2/08*    (2006.01)
*H01M 2/04*    (2006.01)
*H01M 2/02*    (2006.01)

(52) U.S. Cl. ................. 320/112; 320/107; 429/163; 429/175; 429/176; 429/177

(58) Field of Classification Search ............ 320/112, 320/107; 429/151, 159, 163, 175–177
See application file for complete search history.

(56) References Cited

U.S. PATENT DOCUMENTS 6,068,946 A * 5/2000 Zedell et al. ............ 429/100

OTHER PUBLICATIONS

Naka Takayuki, Publication No. JP 2001-076697, Battery pack lid joining structure, Abstract, Figs. 1-4.*

* cited by examiner

*Primary Examiner*—Akm E Ullah
*Assistant Examiner*—Richard V Muralidar
(74) *Attorney, Agent, or Firm*—Cantor Colburn LLP (57) ABSTRACT

Disclosed herein is a battery pack having locking members formed at an upper cover and locking grooves formed at a case body such that the locking members can be engaged in the corresponding locking grooves. The assembly of the battery pack is accomplished by a mechanical coupling method, not by an ultrasonic welding method, and the battery pack is manufactured with a high-strength material. Consequently, the battery pack can be manufactured while the thickness of the battery pack is further decreased.

4 Claims, 6 Drawing Sheets

FIG. 1

*Prior Art*

FIG. 2

*Prior Art*

FIG. 3

Prior Art

FIG. 4

Prior Art

FIG. 5

Prior Art

FIG. 6

Prior Art

BATTERY PACK CASING WITH LOCK TYPE CONNECTOR

FIELD OF THE INVENTION

The present invention relates to a locking-type battery pack, and, more particularly, to a battery pack having locking members formed at an upper cover and locking grooves formed at a case body such that the locking members can be engaged in the corresponding locking grooves, thereby enabling the assembly of the battery pack by a mechanical coupling method, not by an ultrasonic welding method, and enabling the manufacture of the battery pack with a high-strength material such that the thickness of the battery pack is further decreased.

BACKGROUND OF THE INVENTION

As mobile devices have been increasingly developed, and the demand of such mobile devices has increased, the demand of secondary batteries has been also sharply increased as a power source for the mobile devices. One of the secondary batteries is a lithium secondary battery having high energy density and discharge voltage, on which much research has been carried out and which is now commercially and widely used.

Based on its external shape, the lithium secondary battery is classified as a cylindrical battery, a rectangular battery, or a pouch-shaped battery. Based on its electrolyte, the lithium secondary battery is classified as a lithium-ion battery or a lithium-ion polymer battery.

Figure 1:
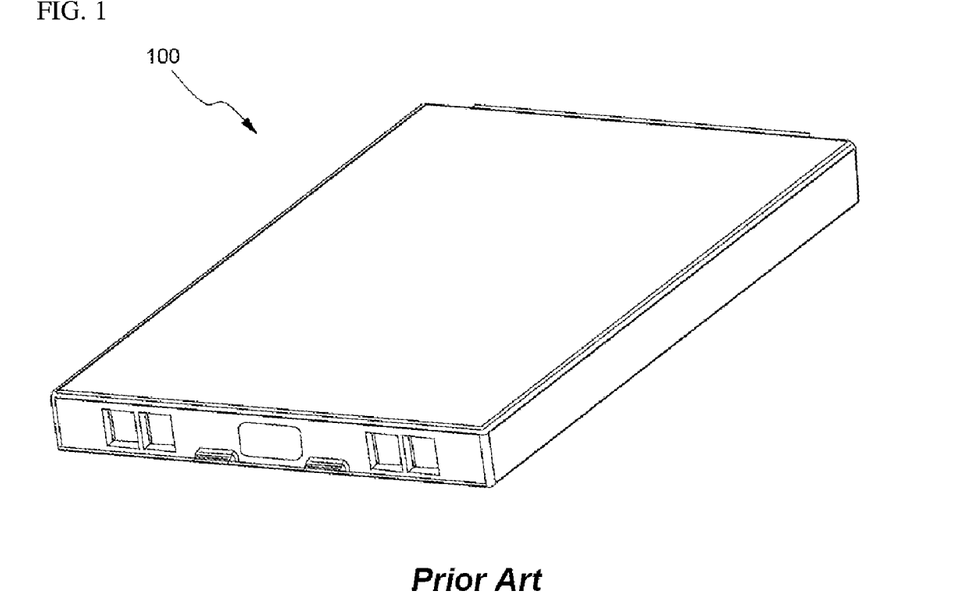
FIG. 1 is a perspective view illustrating a conventional battery pack.
Figure 2:
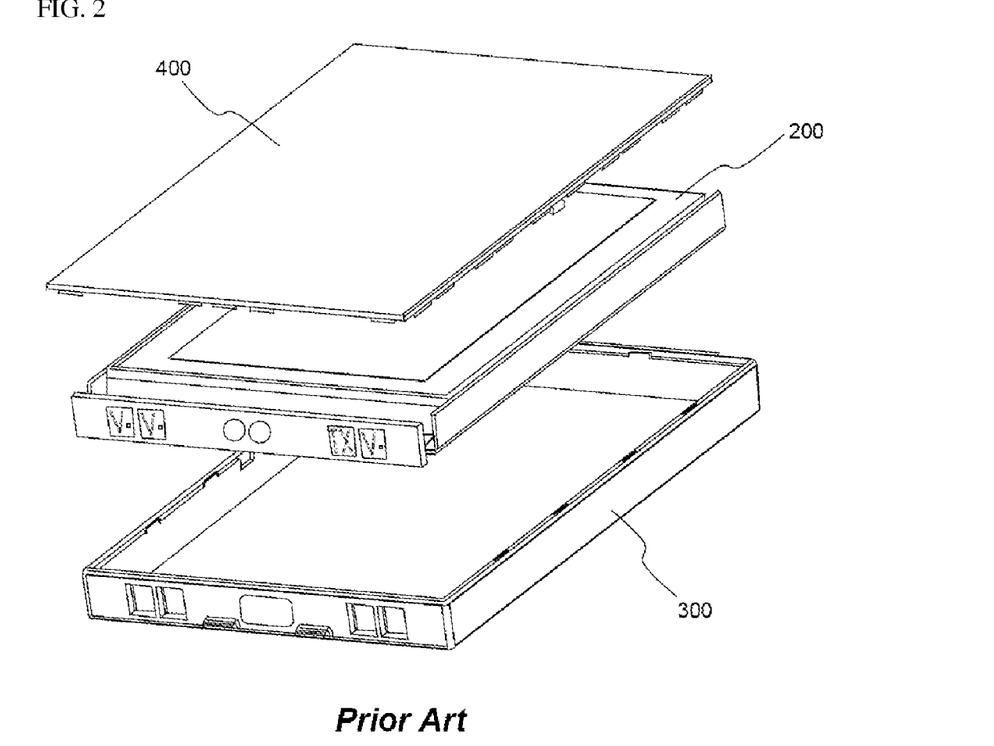
FIG. 2 is an exploded perspective view illustrating the conventional battery pack before assembly.

As the mobile devices have been miniaturized, the demand of the rectangular battery and the pouch-shaped battery, which have a relatively small thickness, has increased. The typical shape of a battery pack, which is one example of such a small-thickness secondary battery, is shown in FIG. 1. FIG. 2 is an exploded perspective view illustrating the battery pack before assembly.

Referring to FIGS. 1 and 2, the battery pack 100 comprises: a rectangular core pack 200 having an electrode group, which includes a cathode, an anode, and a separating film, and an electrolyte mounted therein in a sealed state; a case body 300 having an inner space for receiving the core pack 200; and an upper cover 400 mounted on the case body 300 having the core pack 200 received therein for sealing the core pack 200.

Generally, the assembly of the battery pack 100 having the above-described structure is accomplished by coupling the upper cover 400 and the case body 300, which are made of a plastic material, such as polycarbonate (PC) or polyacrylonitrile-butadiene-styrene (ABS), to each other by an ultrasonic welding method. The ultrasonic welding method is a method of welding two surfaces to be attached using frictional heat generated by high-frequency vibrations, for example, 20,000 Hz.

Figure 3:
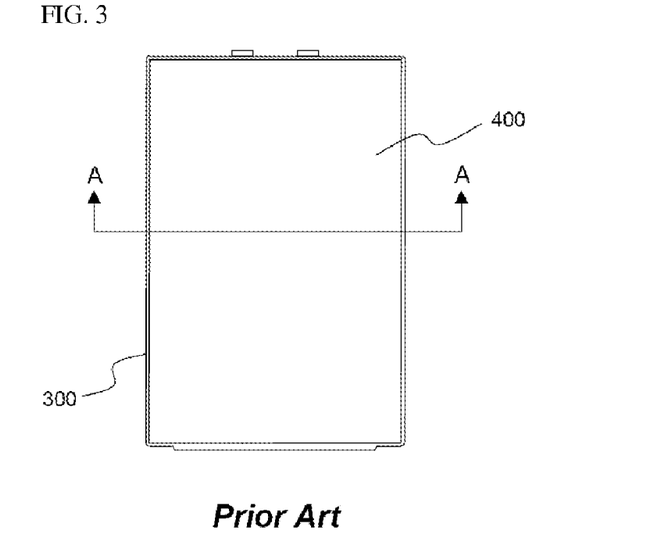
FIG. 3 is a plan view illustrating an upper cover mounted on a case body of the conventional battery pack shown in FIG. 2.
Figure 4:
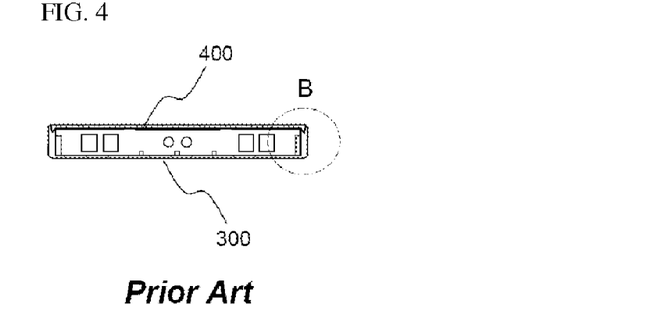
FIG. 4 is a vertical sectional view taken along line A-A of FIG. 3.
Figure 5:
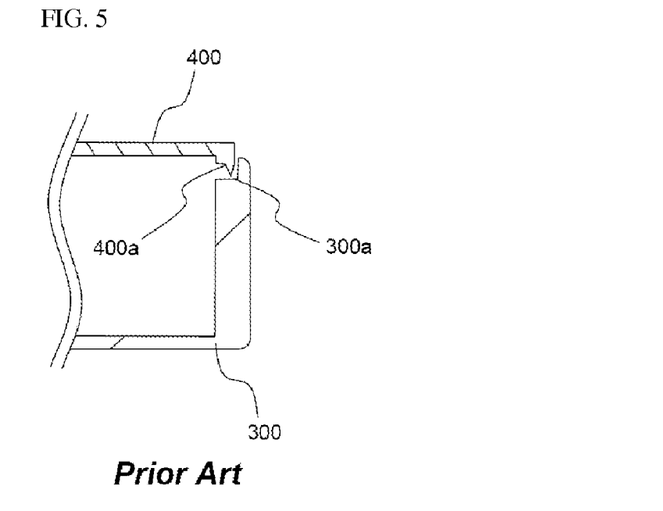
FIG. 5 is an enlarged view illustrating part B of FIG. 4.
Figure 6:
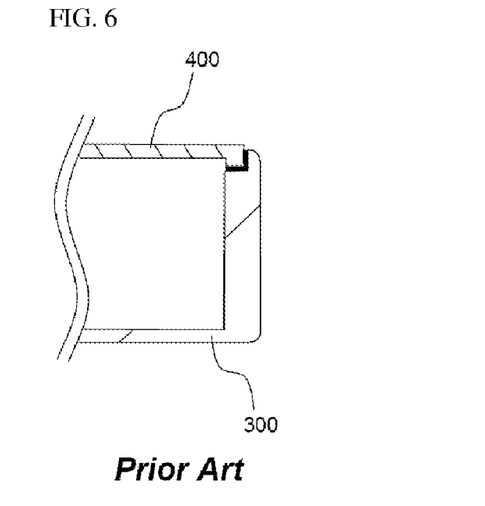
FIG. 6 is a view illustrating the components shown in FIG. 5, which are coupled to each other by an ultrasonic welding method.

Coupling the case body 300 and the upper cover 400 by the ultrasonic welding method will be described in more detail with reference to FIGS. 3 to 6. FIG. 3 is a plan view illustrating the upper cover 400 mounted on the case body 300, and FIG. 4 is a vertical sectional view taken along line A-A of FIG. 3. While the upper cover 400 is mounted on the case body 300, opposite ends of the upper cover 400 are in contact with opposite ends of the case body 300, respectively. FIG. 5 is an enlarged view illustrating the contact area B between the upper cover and the case body, and FIG. 6 is a view illustrating coupling the upper cover and the case body by the ultrasonic welding method. As shown in FIG. 5, a wedge-shaped weld protrusion 400a is formed at the lower surface of each end of the upper cover 400, and a weld surface 300a is formed at the case body 300 such that the weld protrusion 400a is brought into contact with the weld surface 300a. When high-frequency vibrations are applied to accomplish the ultrasonic welding between the upper cover and the case body, the weld protrusion 400a and the weld surfaces 300a are welded, and therefore, the upper cover is securely coupled to the case body.

As the demand of smaller-thickness battery packs has increased, the thickness of the case body 300 and the upper cover 400 has been recently decreased to 0.3 to 0.35 mm. As a result, it is difficult to form the case body and the upper cover by die casting and injection molding. Furthermore, the sizes of the weld protrusion 400a and the weld surface 300a are also decreased, and therefore, the welding strength between the case body and the upper cover is reduced, thereby increasing a welding failure rate.

In the case of a battery using a cylindrical metal case, the case provides an appropriate strength against external impacts due to the structural characteristics of the metal case even when the thickness of the case is small. However, a lithium-ion polymer battery having the structure as shown in FIG. 1 does not have an appropriate structural strength against external impacts, and therefore, use of a small-thickness case in the lithium-ion polymer battery is restricted.

Consequently, it is necessary to provide a battery pack which has an appropriate strength against external impact even when a small-thickness case is used and which has improved coupling strength between the upper cover and the case body.

SUMMARY OF THE INVENTION

Accordingly, it is an object of the present invention to substantially obviate the above-mentioned problems of the conventional arts as well as the technical problems requested from the past.

The inventors have performed various experiments and research on the structure of a battery pack, and have found that, when locking members are formed at an upper cover of the battery pack, and locking grooves are formed at a case body of the battery pack such that the locking members can be engaged in the corresponding locking grooves, the battery pack can be assembled by a mechanical coupling method, not by an ultrasonic welding method, and the battery pack can be manufactured with a high-strength material, thereby further decreasing the thickness of the battery pack.

In accordance with the present invention, the above and other objects can be accomplished by the provision of a battery pack comprising: a rectangular core pack having an electrode group, which includes a cathode, an anode, and a separating film, and an electrolyte mounted therein in a sealed state; a case body having an inner space for receiving the core pack; and an upper cover mounted on the case body having the core pack received therein for sealing the core pack, wherein the upper case is provided at the edge thereof with a plurality of elastic locking members, and the case body is provided at the edge thereof with a plurality of locking grooves, which correspond to the locking members of the upper case, such that the locking members of the upper case are inserted into the locking grooves of the case body while the core pack is received in the case body, whereby the upper cover is coupled to the case body.

According to the present invention, the upper cover can be coupled to the case body by a mechanical coupling method, not by an ultrasonic welding method.

Consequently, it is not necessary to restrict the material for the upper cover and the case body to an ultrasonic welding material. Preferably, the upper case is made of a material having higher strength and elasticity than those of the areas of the case body where the locking grooves are formed. In a preferred embodiment, the upper cover is made of stainless steel (SUS), and the case body is made of a plastic material, such as such as polycarbonate (PC) or polyacrylonitrile-butadiene-styrene (ABS). Alternatively, the case body may be made of a plastic resin only at the areas of the case body where the locking grooves are formed. When the SUS material is used as the material for the battery pack, it is possible to manufacture the battery pack having high strength with a further decreased thickness (for example, 0.1 to 0.2 mm).

The structures of the locking members and the locking grooves are not particularly restricted so long as the coupling between the locking members and the locking grooves is maintained when the locking members are engaged into the locking grooves, i.e., when the protrusion-shaped locking members are inserted into the indent-shaped locking grooves. In a preferred embodiment, each of the locking members comprises a pair of locking protrusions, which are connected to each other while a spacing groove is formed between the locking protrusions, the locking protrusions are provided at the outsides thereof with protrusions, which are formed in the shape of a downward taper, and each of the locking grooves has a width less than the maximum distance between the protrusions of the locking protrusions.

In another preferred embodiment, the case body comprises: a lower cover formed in the same shape of the upper cover, the lower cover being provided at the edge thereof with a plurality of locking members; and a rectangular body frame having a plurality of locking grooves, which correspond to the locking members of the upper and lower covers.

The number and positions of the locking members formed at the edge of the upper cover (or the edges of the upper and lower covers) are not particularly restricted. Preferably, the locking members are uniformly arranged at the edge of the upper cover (or the edges of the upper and lower covers).

The battery pack according to the present invention is very useful for a battery pack for lithium-ion polymer batteries.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

| 100: battery pack | 200: core pack |
|---|---|
| 300: case body | 400: upper cover |
| 500: lower cover | 600: PCM |
| 700: electrode lead | 800: PTC |
| 900: insulating member | 1000: double-sided adhesive tapes |
| 1100: submergence label | |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 7:
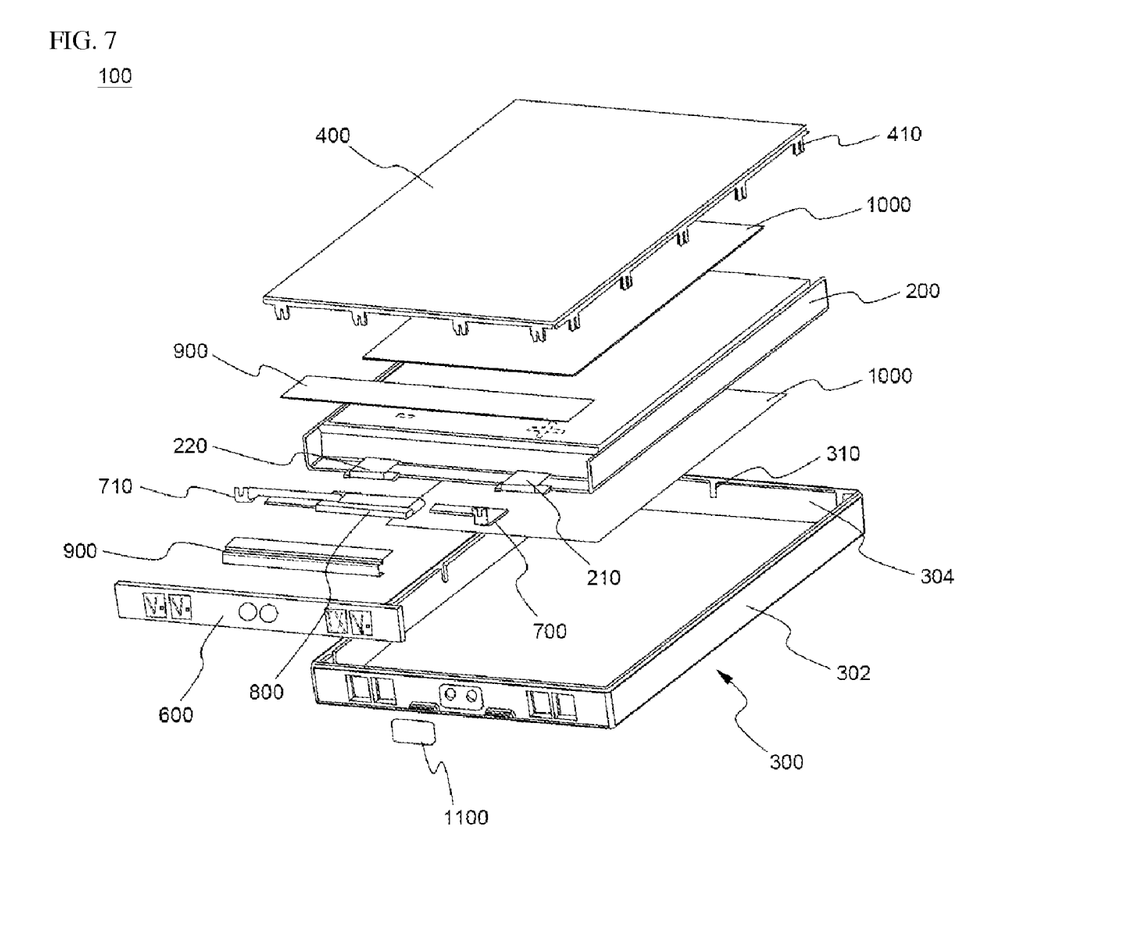
FIG. 7 is an exploded perspective view illustrating a battery pack according to a preferred embodiment of the present invention before assembly.

FIG. 7 is an exploded perspective view illustrating a battery pack 100 according to a preferred embodiment of the present invention before assembly.

Referring to FIG. 7, the battery pack 100 comprises: a core pack 200 having an electrode group, which includes a cathode, an anode, and a separating film, and an electrolyte mounted therein in a sealed state; a case body 300 for receiving the core pack 200; and an upper cover 400 coupled to the case body 300 for sealing the core pack 200.

The core pack 200 has a cathode tap 210 and an anode tap 220, both of which are exposed. The cathode tap 210 is connected to a protection circuit module (PCM) 600 via a cathode lead 700. The anode tap 220 is connected to the PCM 600 via an anode lead 710, which is connected to a positive temperature coefficient element (PTC) 800.

The upper cover 400 is made of an SUS material, and therefore, it is possible that the upper cover 400 can be short-circuited when the upper cover 400 comes into contact with the PCM 600, the electrode leads 700 and 710, and the PTC 800. For this reason, an insulating member 900 is disposed between the upper cover 400 and the PCM 600/the electrode leads 700 and 710/the PTC 800. Also, double-sided adhesive tapes 1000 are disposed between the case body 300 and the core pack 200 and between the upper cover 400 and the core pack 200 such that core pack 200 can be stably fixed while being mounted in the space defined by the case body 300 and the upper cover 400.

At the edge of the upper cover 400 are formed a plurality of locking members 410, which extending toward the case body 300. At the case body 300 are formed locking grooves 310, which correspond to the locking members 410 of the upper cover 400. The case body 300 comprises an outer body part 302, which is made of an SUS material, and an inner body part 304, which is made of a plastic material. The locking grooves 310 are formed at the inner body part 304.

The connections between the electrode taps 210 and 220 and the electrode leads 700 and 710 are welded, and the connections between the PCM 600 and the electrode leads 700 and 710 are welded. After the core pack 200 is located in the inner space of the case body 300, and the upper cover 400 is placed on the case body 300, the locking members 410 of the upper cover 400 are inserted into the corresponding locking grooves 310 of the case body 300 to accomplish the assembly of the battery pack 100. After the assembly of the battery pack 100 is completed, a submergence label 1100 is attached to the upper end of the case body 300.

The coupling between the upper cover 400 and the case body 300 will be described in more detail with reference to FIGS. 8 to 12.

Figure 8:
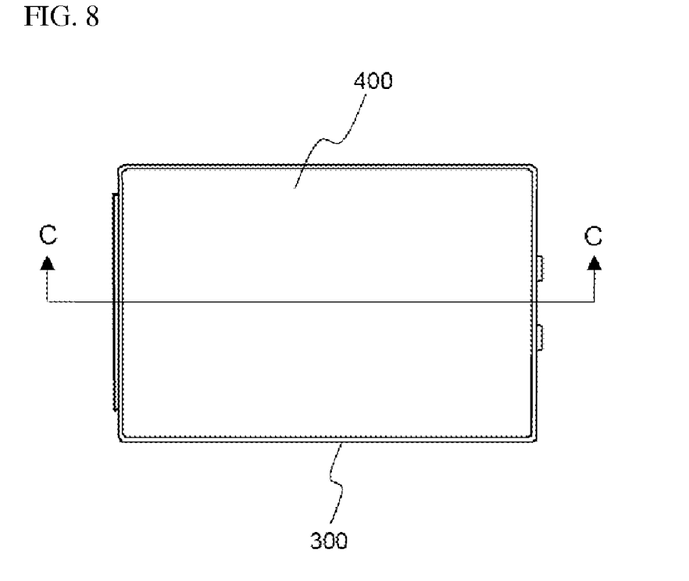
FIG. 8 is a plan view illustrating an upper cover coupled to a case body of the battery pack shown in FIG. 7.
Figure 9:
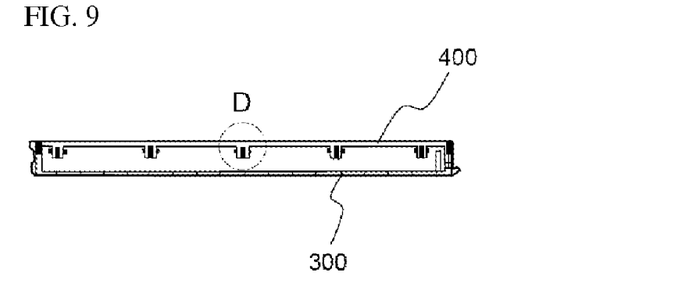
FIG. 9 is a vertical sectional view taken along line C-C of FIG. 8.
Figure 10:
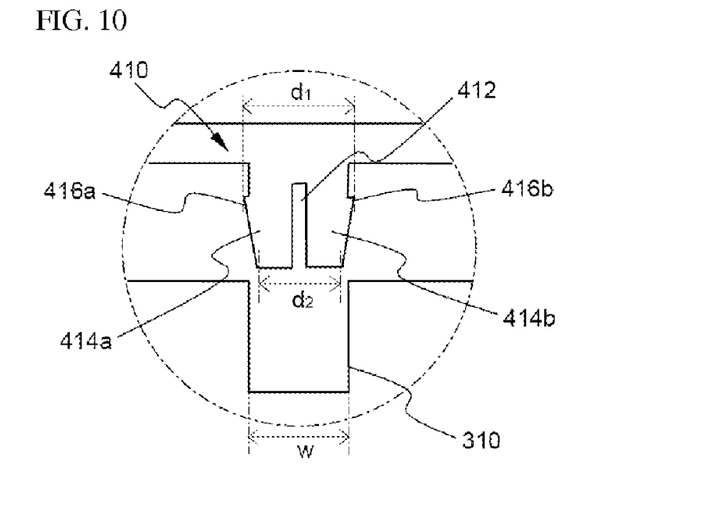
FIGS. 10 to 12 are views sequentially illustrating a coupling process at part D of FIG. 9.
Figure 11:
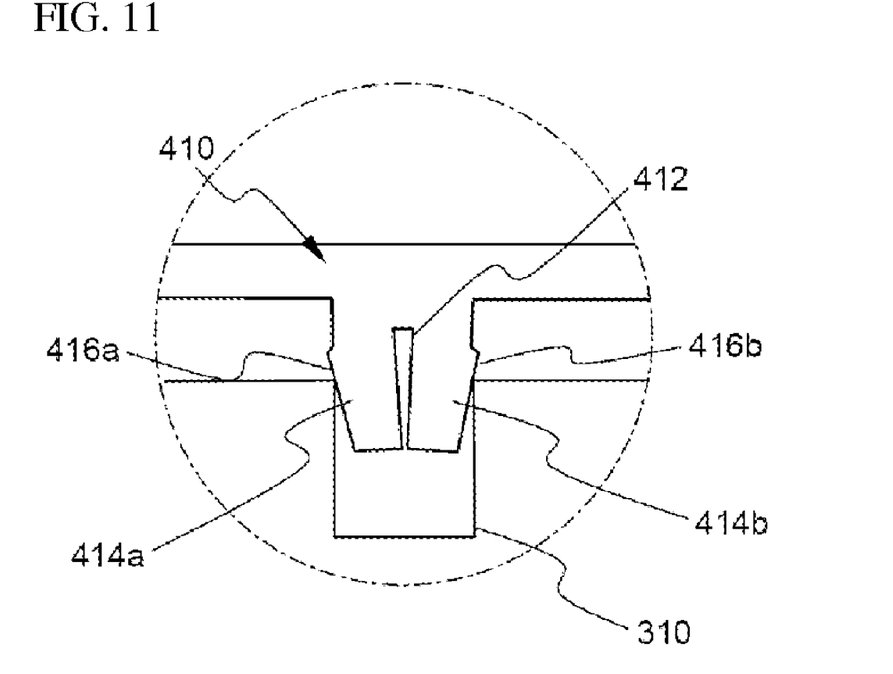
Figure 12:
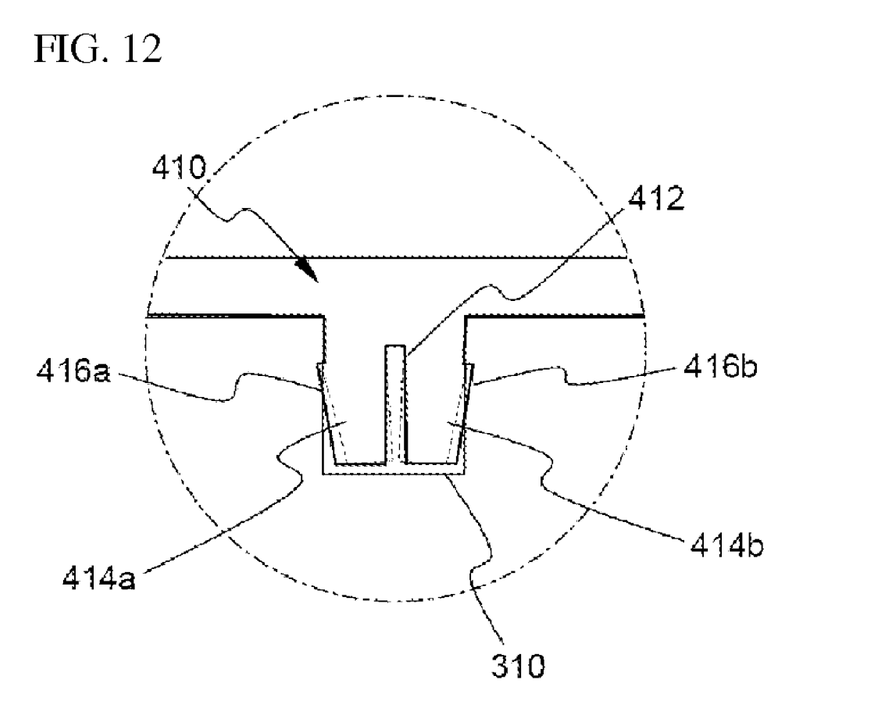

FIG. 8 is a plan view illustrating the upper cover 400 coupled to the case body 300, and FIG. 9 is a vertical sectional view taken along line C-C of FIG. 8. FIGS. 10 to 12 are views sequentially illustrating a coupling process at part D where one of the locking members is engaged in the corresponding locking groove.

Referring first to FIG. 10, each of the locking members 410 comprises a pair of right and left locking protrusions 414a and 414b, which are connected to each other while a spacing groove 412 is formed between the locking protrusions 414a and 414b. At the outsides of the locking protrusions 414a and 414b are formed protrusions 416a and 416b, which are formed in the shape of a downward taper. Each of the locking grooves 310 has a width w less than the maximum distance d1 between the protrusions 416a and 416b of the right and left locking protrusions 414a and 414b. On the other hand, a width d2 of the locking member 410 at the lower end thereof is less than the width w of the locking groove 310. Consequently, the locking member 410 can be easily inserted into the locking groove 310.

When the locking member 410 starts to be inserted into the locking groove 310, however, the upper parts of the protrusions 416a and 416b of the right and left locking protrusions 414a and 414b are compressed by the upper end of the locking groove 310, as shown in FIG. 11, with the result that the right and left locking protrusions 414a and 414b are bent inward. Consequently, the spacing groove 412 becomes narrow, and therefore, the locking member 410 is inserted into the locking groove 310.

After the insertion of the locking member 410 into the locking groove 310 is completed, as shown in FIG. 12, the protrusions 416a and 416b apply pressure to the inner surface of the locking groove 310 by a restoring force of the elastic locking member 410 with the result that the locking force between the locking member and the locking groove is increased. Furthermore, the disengagement of the locking member 410 from the locking groove 310 is prevented by the protrusions 416a and 416b, which are formed in the shape of a downward taper, even when an external force is applied to the locking member and the locking groove. Also, the material for the locking member 410 has a higher strength than that for the locking groove 310. Consequently, portions of the protrusions 416a and 416b penetrate into the case body 300 adjacent to the locking groove 310, and therefore, the locking force between the locking member and the locking groove is further increased.

Figure 13:
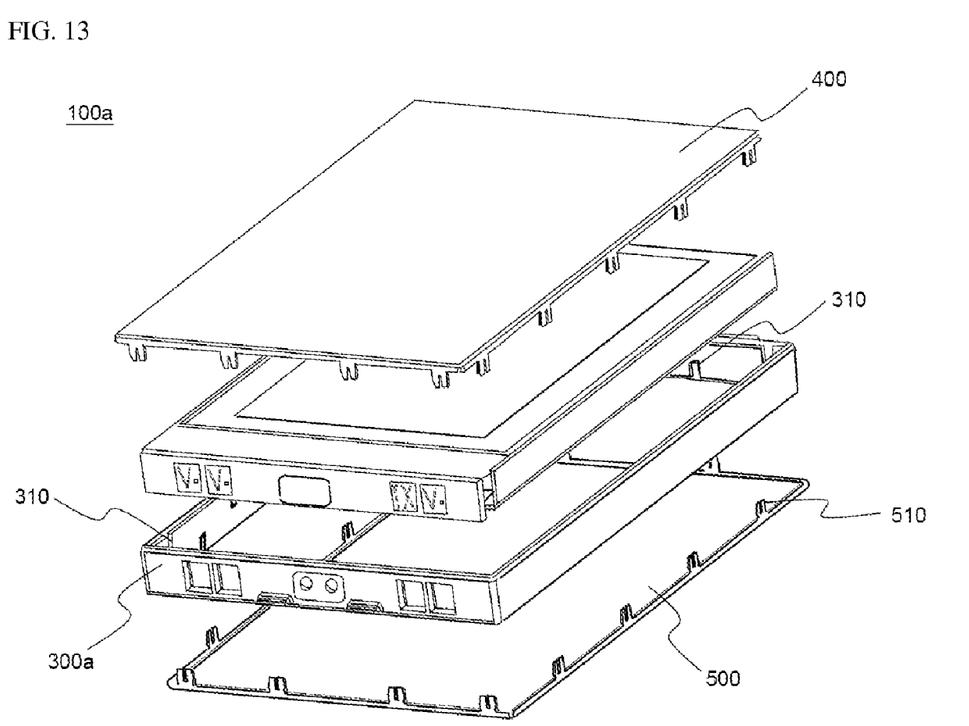
FIG. 13 is an exploded perspective view illustrating a battery pack according to another preferred embodiment of the present invention before assembly.

FIG. 13 is an exploded perspective view illustrating a battery pack 100a according to another preferred embodiment of the present invention before assembly.

As shown in FIG. 13, the battery pack 100a is characterized in that the battery pack 100a includes a body frame 300a opened at the upper and lower parts thereof, and a lower cover 500, which correspond to the case body 300 of FIG. 7, a plurality of locking members 510 are formed at the lower cover 500, and a plurality of locking grooves 310 are formed at the body frame 302 such that the locking members 510 of the lower cover 500 as well as the locking members 410 of the upper cover 400 can be engaged in the locking grooves 310.

Consequently, the battery pack 100a is identical to the battery pack 100 of FIG. 7 except that the lower cover 500 is coupled to the body frame 300a to constitute the case body 300 of FIG. 7, and therefore, a further detailed description of the battery pack 100a will not be given.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, it is possible to manufacture a small-thickness battery pack without using an ultrasonic welding method, and therefore, it is not necessary to use a high-priced precision ultrasonic welding machine. Furthermore, the locking members can be formed by using a general press machine, and it is possible to use a high-strength material, such as a SUS material. Consequently, it is possible to manufacture a battery having high strength against external impacts while the thickness of the battery is significantly reduced.

What is claimed is:

1. A battery pack comprising: a rectangular core pack having an electrode group, which includes a cathode, an anode, and a separating film, and an electrolyte mounted therein in a sealed state; a case body having an inner space for receiving the core pack; and an upper cover mounted on the case body having the core pack received therein for sealing the core pack, wherein the upper case is provided at the edge thereof with a plurality of elastic locking members, and the case body is provided at the edge thereof with a plurality of locking grooves, which correspond to the locking members of the upper case, such that the locking members of the upper case are inserted into the locking grooves of the case body while the core pack is received in the case body, whereby the upper cover is coupled to the case body, wherein each of the locking members comprises a pair of locking protrusions, which are connected to each other while a spacing groove is formed between the locking protrusions, the locking protrusions are provided at the outsides thereof with protrusions, which are formed in the shape of a downward taper, each of the locking grooves has a width less than the maximum distance between the protrusions of the locking protrusions, and wherein the upper cover is made of stainless steel, and the case body is made of a plastic material, wherein the case body is made of a plastic resin at least at the areas of the case body where the locking grooves are formed, whereby the locking protrusions inserted into the locking groove penetrate into the case body adjacent to the locking groove, and the case body conforms to the locking protrusions, by a restoring force to further increase the locking force between the locking member and the locking groove.

2. The battery pack as set forth in claim 1, wherein the upper case is made of a material having higher strength and elasticity than those of the areas of the case body where the locking grooves are formed.

3. The battery pack as set forth in claim 1, wherein the case body comprises:
   a lower cover formed in the same shape of the upper cover, the lower cover being provided at the edge thereof with a plurality of locking members; and
   a rectangular body frame having a plurality of locking grooves, which correspond to the locking members of the upper and lower covers.

4. The battery pack as set forth in claim 1, wherein the core pack is a pack for lithium-ion polymer batteries.

* * * * *